United States Patent [19]

Heyes et al.

[11] Patent Number: 5,100,708
[45] Date of Patent: Mar. 31, 1992

[54] LAMINATED METAL SHEET

[75] Inventors: Peter J. Heyes, Wantage; Nicholas J. Middleton, Highworth, both of England

[73] Assignee: CMB Foodcan plc, Worcester, England

[21] Appl. No.: 707,192

[22] Filed: May 28, 1991

Related U.S. Application Data

[63] Continuation of Ser. No. 372,343, Jun. 9, 1989, abandoned.

[30] Foreign Application Priority Data

Oct. 15, 1987 [GB] United Kingdom ............... 8724240

[51] Int. Cl.⁵ .................. B65D 1/00; B32B 15/08; B32B 27/08
[52] U.S. Cl. ........................... 428/36.91; 428/323; 428/331; 428/457; 428/458; 428/461; 428/474.4; 428/475.8; 428/483; 428/515; 428/516
[58] Field of Search ............ 428/457, 458, 461, 36.91, 428/35.9, 483, 515, 516, 474.4, 323, 331, 475.8

[56] References Cited

FOREIGN PATENT DOCUMENTS

| 0035392 | 9/1981 | European Pat. Off. ............ 428/458 |
| 0209393 | 1/1987 | European Pat. Off. . |
| 2211134A | 6/1989 | United Kingdom . |
| 2211140A | 6/1989 | United Kingdom . |

Primary Examiner—Thomas J. Herbert, Jr.
Attorney, Agent, or Firm—Burns, Doane, Swecker & Mathis

[57] ABSTRACT

A laminated metal sheet, the metal sheet having adhered on at least one of its major surfaces a composite film comprising:

(A1) an inner layer of a thermoplastic polymer incorporating a white pigment and a toner for compensating for the natural color of the metal sheet, and (B1) an outer layer of a thermoplastic polymer incorporating a white pigment, the concentration of white pigment in layer (B1) being lower than the concentration of white pigment in layer (A1).

The laminated metal sheet of the invention is useful for forming into containers or various components thereof.

26 Claims, 2 Drawing Sheets

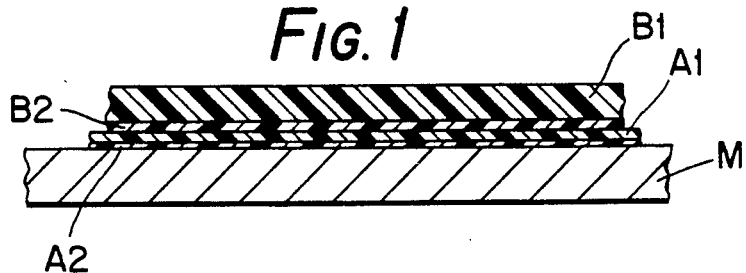
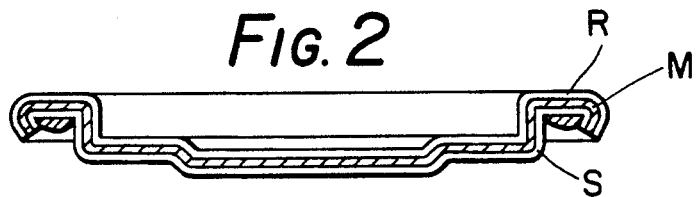
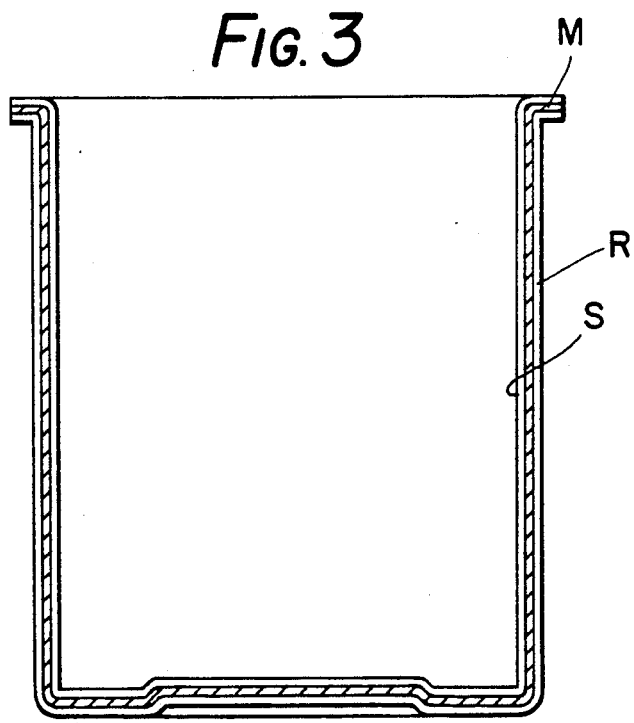

LAMINATED METAL SHEET

This application is a continuation of application Ser. No. 07/372,343, filed June 9, 1989, now abandoned.

The present invention relates to laminated metal sheet.

Lamination of polymer materials to metal sheet such as metal strip is a well known and well documented technique. The resultant laminates have many applications including use for the manufacture of can bodies, can ends and/or can closures.

The coating of metal sheet with thermoplastic coatings containing inorganic fillers or pigments is known. Thus, for example, European Patent Application 0209393 describes the incorporation of inorganic fillers such as white pigments or a variety of coloured pigments into polyolefins, polyamides, or polyesters. The purpose of incorporating such fillers into the polyester films is to improve the deep-drawability of the resultant laminates.

Conventional can making materials, such as tinplate or aluminium are widely used coated with white pigmented coatings for aesthetic purposes. These products set the commercially accepted standards of appearance.

It is also well known in the art that the visual appearance of solvent-based or water-based white coatings applied to steel based substrates is strongly influenced by the steel to which the coating has been applied. The effect is particularly noticeable for black plate and electrolytically chromium coated steel (ECCS), while the effect is less marked with tin plate. The result of this effect is that instead of obtaining a coating which has an acceptable white appearance, a coating having a blue-grey appearance is obtained.

It is known to overcome this problem in conventional liquid based coatings by incorporating with the white pigment an additional coloured pigment thereby to counteract the influence of the underlying substrate on the spectral response of the coating. In the case of ECCS which has a natural blue hue, the incorporation of magenta into the white pigmentation improves the visually perceived whiteness of the relatively thin coatings used in can stock. By suitable formulation, a pigment blend can be incorporated into conventional coatings so as to achieve an acceptable white appearance in the applied and dried coating.

Conventional coating resins used in can stock coatings include polyester, alkyd, vinyl, acrylic, epoxy amino and polyether sulphone. These resins are used with appropriate solvents and diluents. The white pigment used is generally titanium dioxide. Toning pigments are used with the white pigment where necessary.

Appearance is aesthetically, and consequently commercially, important where the coating is external and especially so if the coated ECCS is in close proximity to white coated tinplate as in the case of cone and dome ends formed from ECCS which are seamed to a welded seam white coated tinplate body of a three piece aerosol can.

Laminates comprising metal strip substrates coated with films of extruded thermoplastic resins or combinations of coextruded thermoplastic resins are known as is the addition of pigments to the thermoplastic resins for modifying the appearance or protective properties of the polymer coatings.

We have found that it is only possible to obtain an acceptable appearance in steel based substrates coated with polyolefin, polyamide, co-extruded polyolefin-polyamide or polyester films containing white pigmentation, when the said pigmented films are so thick that they are not technically or economically viable for use as a coating for the steel substrate to be used in manufacture of cans or their end components. Such films have to be made relatively thick because olefins and polyamides will not accept as high a quantity of pigment as conventional coatings and still retain acceptable film making properties in an extrusion process. The relatively low level of pigment which can be incorporated in the film requires that polyamide and polyolefin films should be made thicker than conventional coatings for a given degree of opacity.

The addition of a toner (i.e. a coloured pigment) to the pigmented thermoplastic films enhances the spectral response and enables the thickness of the films to be reduced but not reduced to such an extent that the resultant laminates become economically or technically viable for use in the production of cans on their end components or other containers.

If one attempts to reduce the influence of the underlying steel layer on the visual appearance of the white coating layer by increasing the amount of toner, the appearance improves, but once the optimum level has passed, the coating appearance is marred by the hue of the tinting pigments. The optimum level itself gives a perceived appearance less white than typical conventionally coated tinplate and visually less attractive to the consumer.

We have now found that it is possible to obtain a coated metal sheet having a white coating of good visual appearance even when using a reduced thickness of coating and a reduced loading of pigment when the coating is of a polyolefin, a polyamide or a polyester, by using composite coatings on the metal sheet, the composite film comprising an inner layer of a thermoplastic polymer incorporating a white pigment and a toner for compensating for the natural colour of the metal sheet, and an outer layer of a thermoplastic polymer incorporating a white pigment, the concentration of white pigment in the outer layer being lower than the concentration of white pigment in the inner layer.

Accordingly, the present invention provides a laminated metal sheet, the metal sheet having adhered on at least one of its major surfaces a composite film comprising:

(A1) an inner layer of a thermoplastic polymer incorporating a white pigment and a toner for compensating for the natural colour of the metal sheet, and (B1) an outer layer of a thermoplastic polymer incorporating a white pigment, the concentration of white pigment in layer (B1) being lower than the concentration of white pigment in layer (A1).

If desired, a toner may also be included in the outer layer (B1) but at a lower concentration than in the inner layer (A1). An antiblocking agent or pigment may also be included in the outer layer (B1).

Preferably each of the inner layer (A1) and the outer layer (B1) is chosen from polyolefins, polyamides or polyesters.

BRIEF DESCRIPTION OF THE DRAWINGS

FIG. 1 depicts a sectional view of an embodiment of a laminated metal sheet in accordance with the invention.

FIG. 2 is a sectional view of a food can end.
FIG. 3 is a sectional view of a draw redraw can.

Figure 4:
FIG. 4 is a sectional view of a beverage can end.

An embodiment of a laminated metal sheet in accordance with the invention is illustrated in FIG. 1 which shows a diagrammatic sectional view of a metal sheet (M) coated on one side only with an inner polymer layer (A1) and an outer polymer layer (B1).

Typically, the polyesters are polyethylene terephthalate or polybutylene terephthalate. Preferred polyolefins are polyethylene, polypropylene, ethylene-propylene copolymers or polymethylpentene. Preferred polyamides are Nylon 6, Nylon 66, Nylon 11 or Nylon 12. Layers A1 and B1 may be both polyolefin or polyester or polyamide or combinations thereof.

In preferred laminated metal sheets in accordance with the invention, the inner layer (A1) is bound to the metal sheet by a layer of bonding resin (A2) between the inner layer (A1) and the metal sheet. Similarly, it is preferred to bind the outer layer (B1) to the inner layer (A1) by a bonding resin layer (B2) if (A1) and (B1) do not bond satisfactorily during coextrusion.

The bonding resin of layers (A2) and (B2) is preferably an acid-modified polyolefin resin containing carboxyl or anhydride groups or an acid-modified copolymer if the outer layers (A1) and (B1) are polyolefins or polyamides. If (A1) and (B1) are polyesters, the bonding layer (A2) is preferably a substantially non crystalline polyester.

Typical acids for use in preparing the acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene acrylic acid or methacrylic acid. Typically the acid concentration is usually 5 to 15%.

The anhydride graft modified polyolefin can be diluted with further unmodified polyolefin to produce a bonding resin with an acid content of 0.02 to 0.6%, or 0.05 to 0.25% which is the preferred range. The anhydride modification is measured by infra-red analysis of the peak height at 1790 cm$^{-1}$ after predrying the bonding resin at 200° C. to convert all acid groups, to anhydride functionality. The diluting unmodified polyolefin can be the same polyolefin which has been used to produce the acid modified polyolefin, or it can be a different polyolefin. Thus, for example, an acid modified linear low-density polyethylene (LLDPE) can be diluted with polypropylene or an acid modified polypropylene with a polypropylene.

Preferably, for a bonding resin layer based on polypropylene, the bonding resin melt flow index is 3 to 30 gm/10 minutes, as measured by ASTM D1238.

Particularly preferred bonding resin layers are based on ethylene-propylene random copolymers or blends of linear low-density polyethylene (LLDPE) with polypropylene.

A particularly preferred acid modified olefin copolymer is maleic-anhydride modified ethylene vinyl acetate.

The bonding resin for polyolefin or polyamide based coatings is preferably a maleic-anhydride grafted polypropylene or a maleic-anhydride grafted polyethylene or a maleic-anhydride grafted ethylene-propylene random copolymer, or a blend of such maleic-anhydride grafted polymers in polyethylene, polypropylene or ethylene-propylene random copolymer; or ethylene-acrylic acid copolymer or ethylene-methacrylic acid copolymer.

Preferably, when the polyolefin layer which is to be bound to another layer is a polyethylene, the bonding resin base of the bonding layer is a polyethylene or an acid-ethylene copolymer. Similarly, when the polyolefin layer which is to be bound is a polypropylene or an ethylene-propylene copolymer, the polymer in the bonding resin layer is a polypropylene based polymer. However, when the layer which is to be bound by the bonding resin layer is a polyamide, then the polymer base in the bonding resin layer can either be a polyethylene or a polypropylene base.

Particularly preferred bonding resins for polypropylene and polyamide containing 0.2±0.05% maleic anhydride and a random ethylene propylene copolymer.

The bonding resin (A2) for polyester based coatings is preferably a polyester with a melting point above 150° C. but below 240° C. and a softening point below 150° C., present in a substantially non-crystalline form. Examples of bonding polyesters include copolymers of ethylene glycol with isophthalic and terephthalic acids or copolymers of terephthalic acid with ethylene glycol and cyclohexanedimethanol.

Typically, the amount of white pigment in the inner layer (A1) is 2 to 30% by weight, based on the weight of the inner layer, while typically the amount of white pigment in the outer layer (B1) is 2 to 15% by weight, based on the weight of the outer layer.

Any conventional white pigment material can be used as the white pigment. A preferred white pigment is titanium dioxide having a mean particle size of 0.1 to 2 microns. The amount of the white pigment used in the layers depends on total film thickness. Typically, in a forty micron film the inner layer (A1) is approximately 20-30 microns in thickness and its level of titanium dioxide loading is 20% by weight.

The usual toner (also known as colour compensating pigment), is magenta or magenta with carbon black combinations, where the metal substrate is ECCS.

The toner is used at a level of about 0.01 to 5% by weight, preferably 0.1 to 1% by weight, based on the weight of the inner layer. Typically the toner has a mean particle size of 0.1 to 10 microns. The overall amount of toner used depends on the total film thickness.

The outer layer (B1) may optionally contain antiblocking agents such as synthetic silica, particle size 0.5 to 5 micron and present at 0.1 to 1% by weight. Outer layer (B1) may also contain a toner and an optical brightener.

In a preferred embodiment of the invention, the composite film which is to be applied to the metal sheet is a film which has been prepared by co-extrusion of all the various layers to produce one single composite co-extruded film.

The layers of bonding resin in the co-extruded films must be continuous. The thickness can be as low as 1 micron. Typically such layers constitute 5 to 10% of the total film thickness.

Preferably, the metal laminate contains on its other major surface a coating of a thermoplastic polymer adhered thereto. The said further coating may be constituted by a composite co-extruded film containing various layers of polymer films therein.

The metal substrate to which the polymer film or films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments, or alternatively may be in the form of nickel or zinc plated steel, black plate or phosphated black plate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.01 to 0.20 gm/m$^2$, while the chromium oxide ranges from 0.005 to 0.05 gm/m$^2$. The ECCS is typically derived from deposition systems containing either sulphur containing or fluorine containing catalysts.

The laminated metal sheet according to the invention may be prepared by conventional laminating techniques, but preferably comprises a thermoplastic polymer film adhered to each major face of the metal sheet and is produced by a thermal lamination process such as that described in our U.K. patent applications publication Nos. 2211134A and 2211140A.

The present invention will now be illustrated further by the following Examples.

A number of composite films containing an inner layer (A1) together with an associated tie layer (A2) of bonding resin, and an outer layer (B1) optionally with an associated tie layer (B2) of bonding resin were prepared by cast co-extrusion. The composition of the various composite films and the thicknesses of the various layers (A2), (A1), (B2) and (B1) contained in these films are set out in Table 1.

TABLE 1

COMPOSITION OF COMPOSITE FILMS

| COMPOSITE TYPE | LAYER A2 (Thickness) | LAYER A1 (Thickness) | LAYER B2 (Thickness) | LAYER B1 (Thickness) |
| --- | --- | --- | --- | --- |
| A | Bonding Resin 1 (5 microns) | 96% PP 4% TiO$_2$ (40 microns) | — | PP (5 microns) |
| B | Bonding Resin 1 (5 microns) | 96% PP 4% TiO$_2$ (35 microns) | — | — |
| C | Bonding Resin 1 (5 microns) | 80% PP 20% TiO$_2$ 0.3% Toner (45 microns) | — | — |
| D | Bonding Resin 2 (3 microns) | 80% PP 20% TiO$_2$ 0.3% Toner (29 microns) | Bonding Resin 2 (3 microns) | 93% Nylon 6 7% TiO$_2$ (5 microns) |
| E | Bonding Resin 2 (3 microns) | 80% PP 20% TiO$_2$ 0.3% Toner (32 microns) | — | 93% PP 7% TiO$_2$ (5 microns) |
| F | Bonding Resin 2 (10 microns) | 96% PP 4% TiO$_2$ (190 microns) | — | — |

Key to Table 1
PP represents polypropylene
Bonding Resin 1: Maleic anhydride graft modified polypropylene having 0.05 ± 0.03% maleic anhydride.
Bonding Resin 2: Maleic anhydride graft modified polypropylene having 0.20 ± 0.05% maleic anhydride.
Toner: This was a magenta pigment.

Polymer/metal/polymer laminates were prepared from the composite films described in Table 1. The laminates were prepared by a thermal lamination process in which composite polymer films were simultaneously applied to both major surfaces of metal strip. The laminates were prepared by a process such as that described in more detail in our U.K. patent application publication No. 2211134A.

Typically, laminates were prepared by heating the metal strip to a temperature $T_1$ and composite films were brought into intimate wrinkle free contact with the metal via a pair of lamination rolls. The laminate was heated indirectly to a temperature of approximately 250° C. and held above 200° C. for two seconds before rapidly and uniformly quenching the laminate with cold water. The laminate was dried with a blast of cold air.

EXAMPLES 1 to 6

Each of composite films A to G was laminated to an ECCS metal strip by a thermal lamination process such as that described above using a lamination temperature $T_1$ of 170° ± 20° C..

The appearance of the resultant white laminated coatings was assessed by the following technique:

Appearance quality can be judged subjectively and qualitatively by visual inspection and comparison or by measuring spectral reflectances quantitatively. One method for quantitative specification is the 1976 CIE-LAB colour space which relates to the ten degree standard observer and D65 (daylight) illumination conditions. Measurement conditions include the specular component and exclude the ultra violet component, covering the wavelength 400 to 700 nanometers. In this system the appearance quality is represented by Lightness, the amount of reflected light
Chroma, the strength of colour reflected
Hue, the colouring of the reflected light The hue can be described as combinations of four colours red, yellow, green and blue in a two dimensional plane. In this system:

| Red is 0°, | direction | a |
| Green is 180°, | direction | −a |
| Yellow is 90°, | direction | b |
| Blue is 360°, | direction | −b |

The chroma is the magnitude of the vector in the plane. The resolved components of the vector are a and b.

Differences in appearance between a sample and an accepted standard are qualified by comparing the square root of the sum of the squares of differences in lightness, a and b.

The appearance of the laminated films was assessed by comparison with a standard white lacquered tin plate.

The results are shown in Table 2.

TABLE 2

Colour Analysis of Laminated Film

| Example | Composite Film Type | Colour Difference |
|---|---|---|
| 1 | A | 10 |
| 2 | B | 9.9 |
| 3 | C | 5.6 |
| 4 | D | 3.2 |
| 5 | E | 2.5 |
| 6 | F | 2.1 |

Note: Examples 4 and 5 are examples of laminates in accordance with the invention. The remaining examples are comparative examples.

Comparative Examples 1, 2 and 6 show that relatively acceptable white coatings can be achieved by using very thick coatings (Example 6) compared to thin coatings of similar pigment loading. Comparative Example 3 (when compared with Example 1) shows that addition of toner pigment improves the appearance.

The examples describing this invention—Examples 4 and 5 show how the combination of an outer layer (B1) containing less white pigment and toner than layer (A1) have better appearance than coatings having a thicker layer of white pigment and toner at the same pigment loading (cf Example 3). The unexpected nature of the result is confirmed by the comparison of Examples 1 and 2 where a clear outer layer (Example 1) has no beneficial effect on an untoned pigmented film.

EXAMPLES 7-14

Figure 5:
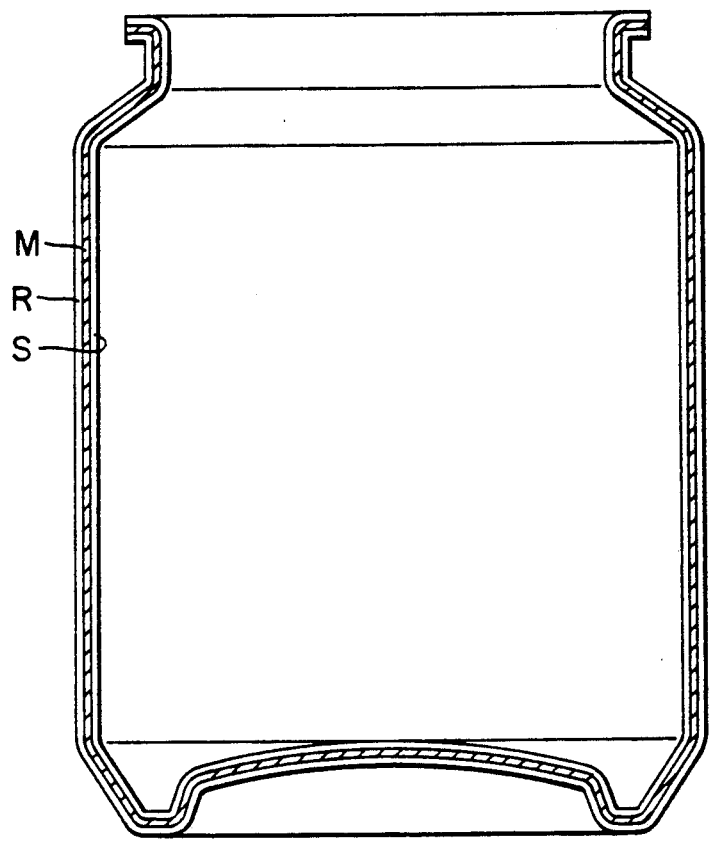
FIG. 5 is a sectional view of a drawn and wall ironed beverage can.
Figure 6:
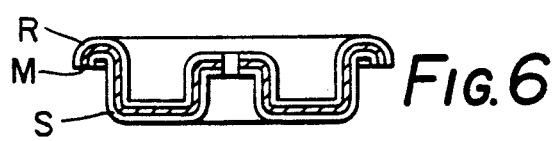
FIG. 6 is a sectional view of an aerosol valve mounting cup.
Figure 7:
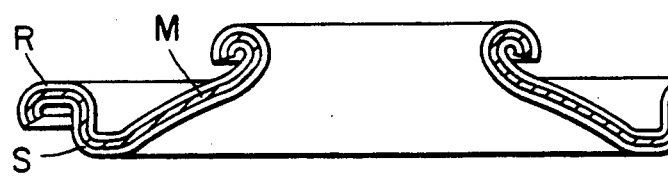
FIG. 7 is a sectional view of an aerosol cone.
Figure 8:
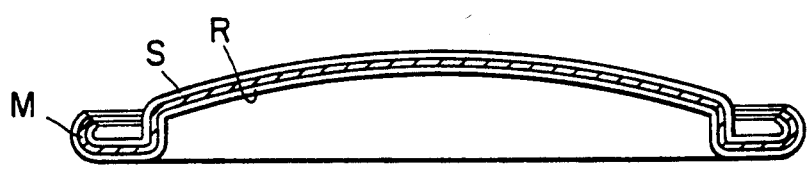
FIG. 8 is a sectional view of an aerosol dome.

The films described in Examples 4 and 5 were laminated to metal strip with thermoplastic coatings on the opposite major surface of metal strip. The laminates were formed into the following articles (as illustrated in FIGS. 2 to 8 of the accompanying drawings; in the drawings, M represents the metal sheet, R represents the external coating and S represents the internal coating):

(i) 73 mm diameter food can ends (as illustrated in FIG. 2);
(ii) 65 mm × 101 mm draw redraw food cans (as illustrated in FIG. 3);
(iii) aerosol valve mounting cups (as illustrated in FIG. 6);
(iv) 65 mm diameter beverage can end (as illustrated in FIG. 4);
(v) 68 mm diameter drawn and wall ironed beverage can (as illustrated in FIG. 5);
(vi) aerosol cone (as illustrated in FIG. 7); and
(vii) 45 mm diameter aerosol dome (as illustrated in FIG. 8).

The laminate structures are described in detail in Table 3.

The white coatings of the resultant laminates were found to have excellent aesthetic appearance, excellent formability, good shelf life characteristics as internal coatings and conferred good external protection to the articles. Containers formed from the laminate of Example 5 readily heat sealed to polypropylene coated aluminium foil.

TABLE 3

Laminates used for Component Manufacture

| Example | Component | Internal Coating(s) | Metal (m) | External Coating *(R) |
|---|---|---|---|---|
| 7 | 73 mm Diameter Food Can End (FIG. 2) | As Example 5 | 0.21 mm ECCS 450 N/mm² | As Example 4 |
| 8 | 65 mm × 101 mm Draw Redraw Can (FIG. 3) | As Example 4 | 0.18 mm ECCS 550 N/mm² | As Example 5 |
| 9 | Aerosol Valve Mounting Cup (FIG. 6) | Bonding Resin (10μ) PP (190μ) | 0.27 mm ECCS 350 N/mm² | As Example 4 |
| 10 | 65 mm Diameter Beverage Can End (FIG. 4) | Bonding Resin (3μ) PP (22μ) | 0.33 mm Aluminium 5182 Alloy Temper H-19 | As Example 4 |
| 11 | 65 mm Diameter Beverage Can End (FIG. 4) | Bonding Resin (3μ) PP (37μ) | 0.24 mm ECCS 550 N/mm² | As Example 4 |
| 12 | 68 mm Diameter DWI Beverage Can (FIG. 5) | Copolymer of ethylene isophthalate (20%) and ethylene terephthalate (80%)-3 microns PET-12 microns | 0.317 mm Aluminium 3004 Alloy Temper H19 | As Example 4 |

TABLE 3-continued

| | | Laminates used for Component Manufacture | | |
|---|---|---|---|---|
| Example | Component | Internal Coating(s) | Metal (m) | External Coating *(R) |
| 13 | Aerosol Cone (FIG. 7) | As Example 5 | 0.31 mm ECCS 350 N/mm$^2$ | As Example 4 |
| 14 | 44 mm Diameter Aerosol Dome (FIG. 8) | As Example 5 | 0.26 mm ECCS 450 N/mm$^2$ | As Example 4 |

*Note: External coating contains 0.5% synthetic silica in addition.

We claim:

1. A container or a component for a container formed from a laminated metal sheet, the metal sheet having adhered on at least one of its major surfaces a composite film comprising:
    (A1) an inner layer of a thermoplastic polymer incorporating a white pigment and a toner for compensating for the natural colour of the metal sheet, and
    (B1) an outer layer of a thermoplastic polymer incorporating a white pigment, the concentration of white pigment in layer (B1) being lower than the concentration of white pigment in layer (A1).

2. A laminated metal sheet, the metal sheet having adhered on at least one of its major surfaces a composite film comprising:
    (A1) an inner layer of a thermoplastic polymer incorporated a white pigment and a toner for compensating for the natural colour of the metal sheet, and
    (B1) an outer layer of a thermoplastic polymer incorporating a white pigment, the concentration of white pigment in layer (B1) being lower than the concentration of white pigment in layer (A1).

3. A laminated metal sheet according to claim 2, wherein layer (B1) also comprises a toner.

4. A laminated metal sheet according to claim 1, comprising a further layer (B2) of a bonding resin between the outer layer (B1) and the inner layer (A1), the bonding resin layer (B2) acting as a layer to adhere the outer layer (B1) to the inner layer (A1).

5. A laminated metal sheet according to claim 1, wherein the amount of white pigment in the inner layer (A1) is 2 to 30% by weight based on the weight of the inner layer.

6. A laminated metal sheet according to claim 1, wherein the amount of white pigment in the outer layer (B1) is 2 to 15% by weight, based on the weight of the outer layer.

7. A laminated metal sheet according to claim 1, wherein the toner in the inner layer (A1) is magneta, or a mixture of magneta with carbon black.

8. A laminated metal sheet according to claim 1, wherein the amount of the toner in the inner layer (A1) is 0.01 to 5% by weight, based on the weight of the inner layer.

9. A laminated metal sheet according to claim 1, wherein the means particle size of the toner is 0.1 to 10 microns.

10. A laminated metal sheet according to claim 2, wherein each of the inner layer (A1) and the outer layer (B1) is chosen from polyesters, polyolefins and polyamides.

11. A laminated metal sheet according to claim 10, wherein the polyolefin is polyethylene, polypropylene, and ethylene-propylene copolymer or polymethylpentene.

12. A laminated metal sheet according to claim 10, wherein the polyamide is Nylon 6, Nylon 66, Nylon 11 or Nylon 12.

13. A laminated metal sheet according to claim 1, comprising a further layer (A2) of a bonding resin between the said inner layer (A1) and the metal sheet, the bonding resin layer (A2) acting as a layer to adhere the inner layer (A1) to the metal sheet.

14. A laminated metal sheet according to claim 13, wherein the bonding resin in layer (A2) and or in layer (B2) is a maleic anhydride graft modified polyolefin containing from 0.02 to 0.5% maleic anhydride, and layers (A1) and (B1) are polyolefins or polyamides.

15. A laminated metal sheet according to claim 13, wherein the bonding resin in layer (A2) is a copolymer of ethyleneglycol with isophthalic acid and terephthalic acid or a copolymer of terephthalic acid with ethyleneglycol and cyclohexanedimethanol, and layer (A1) is a polyester.

16. A laminated metal sheet according to claim 1, wherein the white pigment in each of the outer layer (B1) and the inner layer (A1) is titanium dioxide.

17. A laminated metal sheet according to claim 16, wherein the titanium dioxide has a mean particle size of 0.1 to 2 microns.

18. A laminated metal sheet according to claim 1, wherein the layer (B1) also includes an anti-blocking agent such as synthetic silica having a particle size of 0.2 to 5 microns.

19. A laminated metal sheet according to claim 15, wherein the amount of anti-blocking agent is from 0.1 to 1% by weight, based on the weight of the outer layer (B1).

20. A laminated metal sheet according to claim 2, wherein the metal is steel or an alloy thereof, aluminium or an alloy thereof.

21. A laminated metal sheet according to claim 20, wherein the metal is electrolytically chromium coated steel (ECCS) with a dual layer of chromium metal and chromium oxide.

22. A laminated metal sheet, the metal sheet having adhered on at least one of its major surfaces a composite film comprising:
    (A1) an inner layer of a thermoplastic polymer incorporating a white pigment and a toner for compensating for the natural colour of the metal sheet, and
    (B1) an outer layer of a thermoplastic polymer incorporating a white pigment, the concentration of white pigment in layer (B1) being lower than the concentration of white pigment in layer (A1), wherein each of the inner layer (A1) and the outer layer (B1) is chosen from polyesters, polypropylenes and polyamides; and
a further layer (A2) of a bonding resin between the said inner layer (A1) and the metal sheet, the bonding resin layer (A2) acting as a layer to adhere the inner layer (A1) to the metal sheet.

23. A laminated metal sheet according to claim 22, wherein layer (B1) also comprises a toner.

24. A laminated metal sheet according to claim 22, wherein the polypropylene is an ethylene-propylene copolymer.

25. A laminated metal sheet according to claim 22, wherein the polyamide is Nylon 6, Nylon 66, Nylon 11 or Nylon 12.

26. A container or a component for a container formed from a laminated sheet according to any one of claims 22 through 25.

* * * * *